US009280452B1

(12) United States Patent
Mahadevan et al.

(10) Patent No.: US 9,280,452 B1
(45) Date of Patent: Mar. 8, 2016

(54) SYSTEMS AND METHODS FOR GENERATING TEST CASES

(71) Applicant: Amazon Technologies, Inc., Reno, NV (US)

(72) Inventors: Prasad Ramani Mahadevan, Tamil Nadu (IN); Venkatesh Kancharla, Tamil Nadu (IN); Sai Vinayak, Tamil Nadu (IN); Deepa Subramanian Iyer, Tamil Nadu (IN)

(73) Assignee: Amazon Technologies, Inc., Reno, NV (US)

( * ) Notice: Subject to any disclaimer, the term of this patent is extended or adjusted under 35 U.S.C. 154(b) by 293 days.

(21) Appl. No.: 13/927,366

(22) Filed: Jun. 26, 2013

(51) Int. Cl.
*G06F 11/00* (2006.01)
*G06F 11/36* (2006.01)

(52) U.S. Cl.
CPC ................... *G06F 11/3684* (2013.01)

(58) Field of Classification Search
USPC .......................................................... 714/32
See application file for complete search history.

(56) References Cited

U.S. PATENT DOCUMENTS

| 2005/0240831 A1* | 10/2005 | Balkman et al. | 714/46 |
|---|---|---|---|
| 2010/0235118 A1* | 9/2010 | Moore et al. | 702/57 |
| 2013/0290875 A1* | 10/2013 | Dixit et al. | 715/760 |
| 2014/0298093 A1* | 10/2014 | Cook et al. | 714/27 |

\* cited by examiner

*Primary Examiner* — Sarai Butler
(74) *Attorney, Agent, or Firm* — Sutherland Asbill & Brennan LLP

(57) ABSTRACT

This disclosure relates to systems and methods for generating test cases. In one embodiment, a method is provided that may include identifying, by a computer including one or more processors, a first test event associated with a first user interaction with a first test device. The first user interaction may include interaction with a first display displaying a plurality of applications on the first test device. The method may also include determining, by the computer, at least one first view in which the first test event occurs. Furthermore, the method may include determining, based at least in part on the first test event, a first state of the first test device. Additionally, the method may include storing information about the first test event, the at least one first view, and the first state of the first test device in a first test case.

19 Claims, 5 Drawing Sheets

SYSTEMS AND METHODS FOR GENERATING TEST CASES

BACKGROUND

Developing test cases in order to test certain aspects of a computer and/or computer programs can often prove challenging and time consuming since test cases may be performed manually and may be application and/or device specific. For example, in order to test a device, a tester may manually program/write test cases for the device. In certain instances, the tester must also program/write separate test cases for different applications executed by the device.

Figure 1:
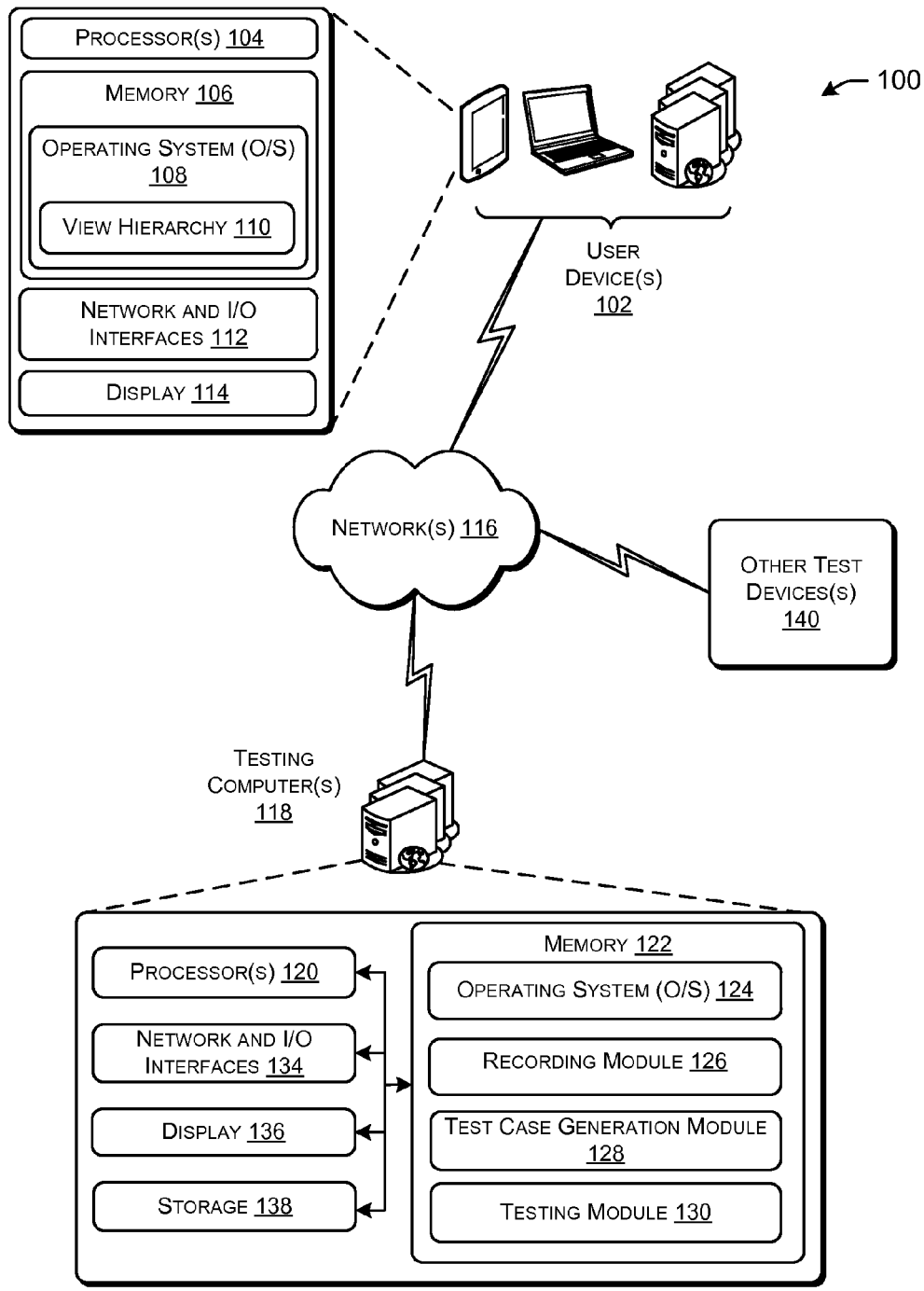
FIG. 1 illustrates a system for generating test cases in accordance with one or more embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like, but not necessarily the same or identical, elements throughout. Hence, if a feature is used across several drawings, the number used to identify the feature in the drawing where the feature first appeared will be used in later drawings.

DETAILED DESCRIPTION

Described herein are systems and methods for generating test cases. Broadly, the systems and methods described herein may facilitate the automatic generation of test cases that may be applied across multiple applications and/or multiple devices. Thus, one or more testing computers may be in communication with a user (test) device. As such, the testing computer may be configured to generate one or more test cases based on user interaction with the test device.

In certain embodiments, the testing computer may be configured to present, to a user (e.g., a tester) of the test device, an option to record the user's interaction with the test device. The testing computer may, upon selection of this option by the user, generate a recording of the user's interaction with the test device for a certain period of time. To this end, the testing computer may be configured to determine, based at least in part on the generated recording, one or more test events associated with the user's interaction. Such test events may include, but are not limited to, touch recognition, swipe gestures, clicks, keyboard inputs, and/or any other type of user input. In addition, the test events may be associated with respective coordinate locations that indicate the relative position, on a display of the device, of where the test events occurred.

Furthermore, the testing computer may be configured to access a view hierarchy associated with the test device and/or an operating system of the test device. The view hierarchy may indicate one or more views associated with one or more user interfaces that may be provided by the test device. In some implementations, the view hierarchy may be a tree structure that stores relationships between multiple views in the user interfaces. To this end, a view may represent a drawn/displayed component for a particular user interface. The view may be a rectangular area of any size and may include one or more sets of coordinate boundaries that define the rectangular area on the display of the test device.

In some implementations, the testing computer may be configured to search the view hierarchy for the view in which the test event occurred. Additionally, the testing computer may be configured to determine a state of the test device resulting from the test event. As such, the testing computer may be configured to generate a test case based at least in part on the test event, the view in which the test event occurred, and the state of the test device. Thus, a test case may include information associated with the test event, the view in which the test event occurred, and the state of the test device.

Once the test case has been generated, the testing computer may be configured to "play" and/or execute the test case on a second test device. To this end, the test case may be performed based on the view(s) associated with the test event(s), and not on absolute coordinates of the test event. Thus, the test case may be replicated and/or performed on the second test device, despite the fact that the second test device may be associated with a different display resolution than the test device and/or may have a different form factor than the test device. Additionally, a test case may include multiple test events representing multiple different aspects of user interaction. To this end, the relationships between test events and views may also facilitate the execution of the test case across multiple applications. In other words, test cases may be performed without being limited to a single application.

Thus, according to one or more embodiments of the disclosure, a method is provided for generating test cases. The method may include identifying, by a computer including one or more processors, a first test event associated with a first user interaction with a first test device. The first user interaction may include interaction with a first display displaying a plurality of applications on the first test device. The method may also include determining, by the computer, at least one first view in which the first test event occurs. Furthermore, the method may include determining, based at least in part on the first test event, a first state of the first test device. Additionally, the method may include storing information about the first test event, the at least one first view, and the first state of the first test device in a first test case. The method may also include identifying a second test event associated with a second user interaction with the first display on the first test device and determining at least one second view in which the second test event occurs. To this end, the method may further include determining, based at least in part on the second test event, a second state of the first test device and storing information about the second test event, the at least one second view, and the second state of the first test device in a second test case.

In certain embodiments, the method may also include executing the first test case with respect to a second test device and determining a first state of the second test device in response to the execution of the first test case on the second test device. Moreover, the method may include comparing, by the computer, the first state of the first test device with the first state of the second test device. In addition, the method may include executing the second test case with respect to the second test device and determining a second state of the second test device in response to the execution of the second test case on the second test device. As such, the method may include comparing, by the computer, the second state of the first test device with the second state of the second test device.

According to one or more other embodiments of the disclosure, a testing system is provided. The testing system may include at least one memory for storing data and computer-executable instructions. The testing system may also include at least one processor to access the at least one memory and to execute the computer-executable instructions. The at least one processor may be configured to execute the instructions to identify a test event associated with user interaction with a first test device, the user interaction comprising interaction with a first display displaying a plurality of applications on the first test device. The at least one processor may also be configured to execute the instructions to determine, based at least in part on the user interaction, a test event. The at least one processor may further be configured to execute the instructions to identify a view in which the test event occurs and determine, based at least in part on the test event, a test state of the first test device. Moreover, the at least one processor may be configured to execute the instructions to generate a test case for the first test device. In one or more embodiments of the disclosure, the test case may include the event, the view, and the test state.

According to one or more embodiments of the disclosure, a non-transitory computer-readable medium is provided. The non-transitory computer-readable medium may have embodied thereon instructions executable by one or more processors. The instructions may cause the one or more processors to generate a test case for the first test device. The test case may include the event, the view, and the test state. The instructions may also cause one or more processors to determine, based at least in part on the user interaction, a test event. Furthermore, the instructions may cause the one or more processors to identify a view in which the test event occurs and determine, based at least in part on the test event, a test state of the first test device. Moreover, the instructions may cause the one or more processors to generate a test case for the first test device. In one or more embodiments, the test case may include the event, the view, and the test state.

With reference now to FIG. 1, a system 100 for generating test cases is shown according to one or more embodiments of the disclosure. The system 100 may include one or more test device(s) 102. In general, the test device 102 may refer to any type of electronic device, and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The test device(s) 102 may include one or more computer processors 104, a memory 106 storing an operating system 108 and a view hierarchy 110, network and I/O interfaces 112, and a display 114. In certain embodiments, the test device(s) 102 may include one or more sensors capable of gathering information associated with a present environment of the test device(s) 102, or similar hardware devices, such as a camera, a microphone, an antenna, or a Global Positioning Satellite (GPS) device.

The computer processors 104 may comprise one or more cores and may be configured to access and execute (at least in part) computer-readable instructions stored in the memory 106. The one or more computer processors 104 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The test device 102 may also include a chipset (not shown) for controlling communications between the one or more processors 104 and one or more of the other components of the test device 102. In certain embodiments, the test device 102 may be based on an Intel® architecture or an ARM® architecture, and the processor(s) and chipset may be from a family of Intel® processors and chipsets. The one or more processors 104 may also include one or more application-specific integrated circuits (ASICs) or application-specific standard products (ASSPs) for handling specific data processing functions or tasks.

The memory 106 may include one or more computer-readable storage media (CRSM). In some embodiments, the memory 106 may include non-transitory media such as random access memory (RAM), flash RAM, magnetic media, optical media, solid state media, and so forth. The memory 106 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 106 may store an operating system 108 that includes a plurality of computer-executable instructions that may be implemented by the computer processor to perform a variety of tasks to operate the interface(s) and any other hardware installed on the test device 102. The memory 106 may also store content that may be displayed by the test device 102 or transferred to other devices (e.g., headphones) to be displayed or played by the other devices. The memory 106 may also store content received from the other devices. The content from the other devices may be displayed, played, or used by the test device 102 to perform any necessary tasks or operations that may be implemented by the computer processor or other components in the test device 102. Furthermore, the memory 106 may store a view hierarchy 110, such as in the operating system 108. The view hierarchy 110 is described in more detail below with reference to FIG. 2B.

The network and I/O interfaces 112 may also include one or more communication interfaces or network interface devices to provide for the transfer of data between the test device 102 and another device (e.g., network server) via a network 116. The communication interfaces may include, but are not limited to: personal area networks (PANs), wired local area networks (LANs), wireless local area networks (WLANs), wireless wide area networks (WWANs), and so forth. The test device 102 may be coupled to the network via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the test device 102 and another device, such as an access point, a host computer, a server, a router, a reader device, and the like. The network may include, but is not limited to, the Internet, a private network, a virtual private network, a wireless wide area network, a local area network, a metropolitan area network, a telephone network, and so forth.

The display 114 may include, but is not limited to, a liquid crystal display, a light-emitted diode display, or an E-Ink™ display as made by E Ink Corp. of Cambridge, Mass. The display 114 may be used to show content to a user in the form of text, images, or video. In certain instances, the display 114 may also operate as a touch screen display that may enable the user to initiate commands or operations by touching the screen using certain finger or hand gestures.

According to one or more embodiments, the test device(s) 102 may be in communication with one or more testing computer(s) 118. In some implementations, the test device(s) 102 may be in communication with the testing computer(s) 118 via one or more network(s). Alternatively, the test device(s) 102 may be directly connected to the testing computer(s) 118. The testing computer(s) 118 may include one or more processors 120 and a memory 122. As such, the memory 122 may store an operating system 124, a recording module 126, a test case generation module 128, and a testing module 130. In addition, the testing computer(s) 118 may also include network and I/O interfaces 134, a display 136, and storage 138. It should be noted that the various modules included in the testing computer(s) 118 are for exemplary purposes only. The functionality associated with these modules may be performed by any number of entities and/or components. For example, in some implementations, the functionality and/or features associated with the recording module 126, the test case generation module 128, and the testing module 130 may be included within a single application stored in the memory 122 of the testing computer(s) 118.

In certain embodiments, the recording module 126 of the testing computer(s) 118 may be configured to record one or more user interactions with one or more applications (and therefore, one or more user interfaces of the applications) on the test device(s) 102. For example, the recording module 126 may be configured to prompt a user of the test device 102 (e.g., via a user interface provided by the testing computer(s) 118) to select whether the user would like to record his/her interactions with the test device 102. Such a recording may be for a predetermined period of time. Alternatively the user may select when to begin and/or when to end the recording. In certain implementations, the user could be a tester testing the operating system 108 of the test device(s) 102 and/or applications that may be executed within the operating system 108.

Once the recording has been generated by the recording module 126, the test case generation module 128 may analyze the recording to determine and/or identify one or more test events. Test events may correspond to certain user interactions with the test device 102, such as clicks, user touches, swipe gestures, key presses, keyboard inputs, selections, and/or any other user input. Furthermore, the test case generation module 128 may be configured to determine one or more coordinate locations associated with a test event. The coordinate locations may indicate information associated with the position of where the test event occurred on the display 114 of the test device 102. For example, if a test event represents a click, the click may be associated with an x-coordinate and y-coordinate pair (e.g., {x-coordinate, y-coordinate}). As another example, if the test event represents a swipe gesture (e.g., swiping a finger along the display 114 of the test device 102), the swipe gesture may be represented by two coordinate pairs {x-coordinate 1, y-coordinate 1, x-coordinate 2, y-coordinate 2}, representing the starting point and ending point, respectively, of the swipe gesture. Although in other embodiments, the swipe gesture may be represented by more than two coordinate pairs.

While the coordinate locations associated with a test event may accurately describe the position(s) of where the test event occurred on the display 114 of the test device 102, such coordinate locations may not be translatable to other test devices 140, which may include different display resolutions and/or different form factors than the test device 102. Furthermore, a particular coordinate location may represent different aspects of a user interface, depending on the application. For example, a particular coordinate location may represent a button in one user interface, and may simply be white space in another user interface. Thus, executing test events based on coordinate locations without any context may provide inaccurate results. Therefore, according to one or more embodiments, the system 100 may be configured to generate test cases based on identifying respective views associated with test events.

Before discussing the determination of test events and their associated views in more detail, a brief discussion of the relationship between applications, activities, and views is provided hereinafter. Generally, an application may be a computer program executed by the operating system 108 in the test device 102. Typically, an application may interact with a user and cause the operating system 108, and/or the processor(s) 104 to perform various tasks. In certain embodiments, an application may include one or more activities.

An activity may represent a user interface component that a user may interact with to accomplish a particular goal or purpose. In some instances, an activity may be displayed as a full screen. Alternatively, in other embodiments, activities may be windows or other components of any size, which may either be displayed or executed in the background. Activities may provide user interface components for facilitating various user interactions. Such interactions may include dialing a phone, taking a photograph, composing an email, viewing a map, and/or the like. Thus, within an application, multiple activities may be included that may facilitate communication with the user and with each other.

In order to facilitate interaction with the user, an activity may be associated with one or more views. To this end, a view may represent a display area of the display 114. While the display area may be rectangular in some embodiments, other geometric and non-geometric shapes are also possible. Furthermore, a view may indicate what is drawn or displayed in the display area and may facilitate responses to events (e.g., any type of user input) that may occur within the display area. Additionally, some views, such as composite views, may include multiple views. A view may also be associated with one or more view properties, such as size, area, color, position, type, coordinate boundaries, and/or the like. In certain instances, the view properties may include coordinate boundaries that indicate size and/or boundaries of the display area represented by the view. For example, in instances where the view represents a rectangular display area, the view may be associated with four pairs of coordinates that define each corner of the rectangular display area.

According to one or more embodiments, a view hierarchy 110 may be stored in the test device 102 and may be maintained by the operating system 108. In certain implementations, the view hierarchy 110 may be a data structure and/or an operating system-level service that indicates relationships between different views and/or between views and activities. For instance, the view hierarchy 110 may be a tree-like structure where nodes in the view hierarchy 110 represent different views. Furthermore, a node may store information that indicates one or more activities the node (or the view represented by the node) may belong to or with which it may otherwise be associated. For example, the node may store one or more identifiers indicating the activities, such as an application package name, class, and/or the like. The view hierarchy 110 and its relationship to views and user interfaces will be described in more detail with reference to FIG. 2A and FIG. 2B.

Thus, given the framework between applications, activities, and views described above, the testing computer(s) 118 may be configured to identify test events from recorded user interactions with a test device 102. The testing computer(s) 118 may also determine the respective view(s) in which those test events occur. For example, the test case generation module 128 may receive recorded user interactions from the recording module 126 and determine a test event therefrom. In addition, the test case generation module 128 may be configured to access the view hierarchy 110 stored in the memory 106 of the test device 102. Based at least in part on the view hierarchy 110 and/or the test event, the test case generation module 128 may determine an activity associated with the test event. In other words, the test case generation module 128 may determine under which activity the test event was performed.

Once the test case generation module 128 has determined the activity, the test case generation module 128 may search relevant portions of the view hierarchy 110 that relate to the particular activity in order to determine the view in which the test event occurs and/or is performed. In some embodiments, the test case generation module 128 may perform a depth-first search on the view hierarchy 110 to determine one or more potential views that may include the test event. For instance, the one or more potential views may all include respective coordinate boundaries. To this end, the coordinate location(s) associated with the test event may lie within the respective coordinate boundaries. Moreover, the test case generation module 128 may be configured to determine/calculate the areas for the one or more potential views. To this end, the test case generation module 128 may identify the potential view having the smallest area and determine that this potential view is the view in which the test event occurs.

In certain embodiments, the test case generation module 128 may also be configured to determine and/or store state information associated with the test device 102 after the occurrence of the test event. The state information may include the determined view, as described above, and/or any other information stored in the memory 106 after occurrence of the test event. For example, in some embodiments, the state information may include information indicating what is displayed by the display 114 after occurrence of the test event, such as user interfaces, and user interface components. In other embodiments, the state information may also include document output models (DOMs), which may indicate the relationship between the user interface components and how these components may interact as a result of the test event. Thus, the test case generation module 128 may be configured to generate a test case, which may include information associated with the test event, the determined view in which the test event occurs, and the state of the test device 102 after occurrence of the test event. It should be noted that while the test case generation module 128 has been described as generating a test case based on a single test event, test cases may include multiple test events, each of which may be performed with respect to multiple different activities across multiple applications. Furthermore, test cases may be stored on the testing computer(s) 118 such as in the memory 122, the storage 138, and/or any other storage location.

According to some implementations, the test case may also include a script or other types of data that indicate instructions for the testing computer(s) 118. The testing computer(s) 118 may execute the instructions to perform the test event(s) associated with the test case on the other test device(s) 140. In some implementations, the other test devices 140 may include the same and/or similar operating system 108 of the test device 102. For instance, the testing computer(s) 118 may be configured to execute the test case for the other or second test device 140. To this end, the test case may be provided to the testing module 130, which may determine, from the test case, the test event, the view in which the test event occurred, and the state information after occurrence of the test event. As such, the testing module 130 may transmit/provide instructions that cause the second test device 140 to perform/execute the test event. In response to executing the test event, the second test device 140 may display a second view. The testing module 130 may be further configured to analyze/determine state information associated with the second test device 140 after execution of the test event on the second test device 140. As such, this state information may be compared to the state information included in the test case (e.g., the state information that was initially captured with the first test device 102). Furthermore, the second view displayed by the second test device 140 may be compared to the view included in the test case.

Based at least in part on these comparisons, the testing module 130 may determine whether the second test device 140 passes or fails the test case. In some embodiments, if the state information associated with the second test device 140 is identical to the state information associated with the first test device 102, the testing module 130 may determine that the second test device 140 has passed the test case. Otherwise, the testing module 130 may determine that the second test device 140 has failed the test case. For example, the state information for first test device 102 (e.g., the state information included in the test case) and the second test device 140 may include their respective view hierarchies. Therefore, comparing the state information may include comparing the respective view hierarchies. To this end, the view included in the test case in the second view displayed by the second test device 140 may indicate the respective portions of the respective view hierarchies to compare. Thus, comparing the respective view hierarchies may include comparing these respective portions to determine whether these respective portions are identical. It should be appreciated that various other metrics may also be used to determine whether the test case has been passed or failed.

Thus, the system 100 depicted in FIG. 1 may facilitate the automatic generation of test cases based on user interactions with a test device 102. Furthermore, because the test events in the test cases may be associated with views rather than absolute coordinate locations, the test cases may be executed across different applications and across devices having different display resolutions and different form factors. For example, consider a scenario in which a first test device 102 is associated with a user interface providing a selectable button. Additionally, a test event may include touching the button (or otherwise selecting the button), and the touch may be associated with a coordinate location with respect to the display 114 of the first test device 102. Thus, with respect to the first test device 102, the coordinate location may indicate the position of the touch and of the button. However, if the user interface is then displayed on a second test device 140 with a different resolution and/or form factor, the coordinate location may not correspond to the position of the button as displayed on the second test device 140. Thus, executing the test event (e.g., the touching) on the second test device 140 may not result in the touching and/or selection of the button. On the other hand, if the test event is instead associated with a view that corresponds to the button, executing the test event may result in the touch and/or selection of the button regardless of the position in which it is displayed on the first test device 102 or the second test device 140, respectively.

Moreover, as mentioned above, the system 100 may facilitate the generation of test cases that include test events performed across different applications. Typically, a test case may be restricted to including only test events for a single application because underlying program code associated with the application (e.g., a virtual machine associated with the application) may need to be modified in order to execute the test events on another test device 140. However, because the testing computer(s) 118 may be configured to determine/associate views with respective test events, and such determinations may not rely on modifying program code associated with the applications, the testing computer(s) 118 may be able to facilitate the execution of test cases, which include test events performed across multiple applications.

Figure 2A:
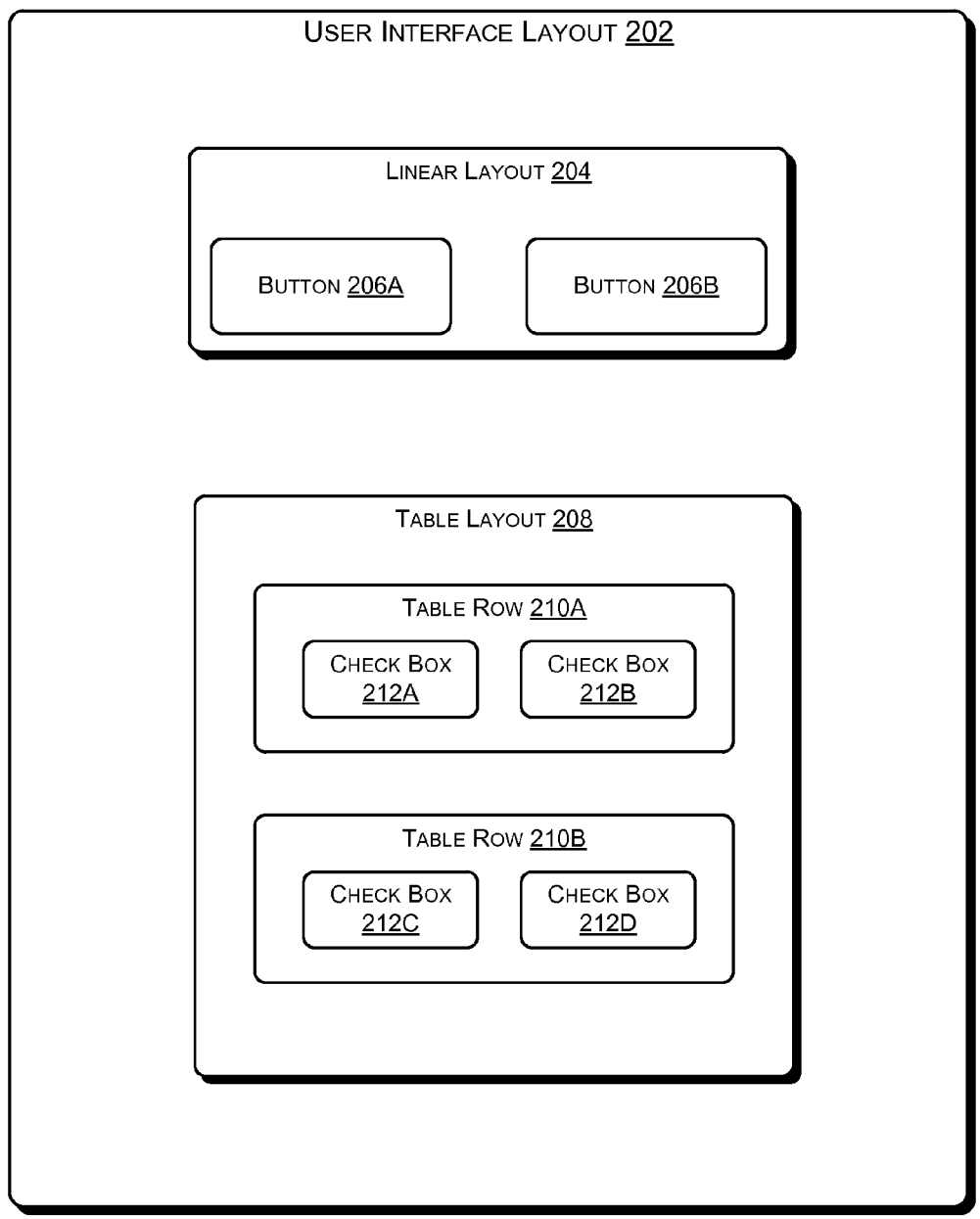
FIG. 2A illustrates a block diagram of a user interface for generating test cases in accordance with one or more embodiments of the disclosure.

Turning now to FIG. 2A, a diagram of a user interface 200A with respect to one or more views is provided in accordance with one or more example embodiments. The user interface 200A may depict various views that may represent different user interface components. For example, one view may be a composite view (e.g., a view that includes multiple views) called the user interface view 202. The user interface view 202 may include other views and/or composite views such as the linear view 204 and the table view 208. The linear view 204 may include buttons 206A-B. The table view 208 may include a table row 210A, which may include two check boxes 212A-B. The table view 208 may also include another table row 210B, which may also include two check boxes 212C-D. It should be noted that the user interface 200A depicted in FIG. 2A is merely exemplary and that other user interfaces having different views and display arrangements are also contemplated herein.

Figure 2B:
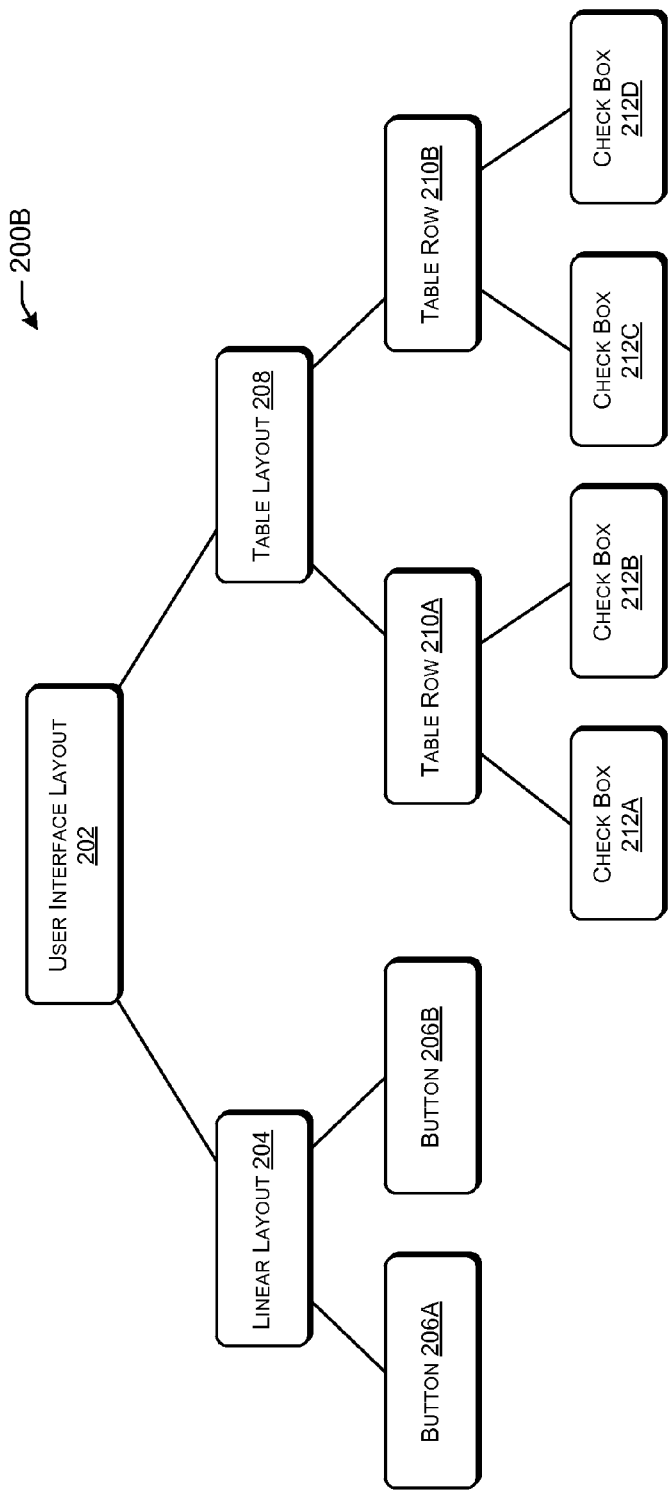
FIG. 2B illustrates a view hierarchy of one or more user interfaces in accordance with one or more embodiments of the disclosure.

FIG. 2B illustrates a view hierarchy 200B corresponding to the user interface 200A depicted in FIG. 2A in accordance with one or more example embodiments. According to one or more embodiments, a root node of the view hierarchy 200B may include the user interface view 202. Child nodes of the user interface view 202 may include the linear view 204 and the table view 208. Furthermore, the child nodes of the linear view 204 may include the two buttons 206A-B while the child nodes of the table view 208 may include the two table rows 210A-B. In addition, the child nodes of the table row 210A may include the two check boxes 212A-B, and the child nodes of the table row 210B may include the two check boxes 212C-D. It should be appreciated that the view hierarchy 200B illustrated in FIG. 2B is merely a simplified example. The view hierarchy 200B may be any size and may include any number of nodes. Moreover, the view hierarchy 200E may represent or may otherwise be associated with multiple applications and multiple activities within each of the respective applications. In addition, the views of the view hierarchy 200E may include one or more view properties, such as size, area, color, position, type, coordinate boundaries, and/or the like. Nodes of the view hierarchy 200E may also include information indicating one or more activities that the nodes (and/or the views represented by the nodes) belong to or are otherwise associated.

Figure 3:
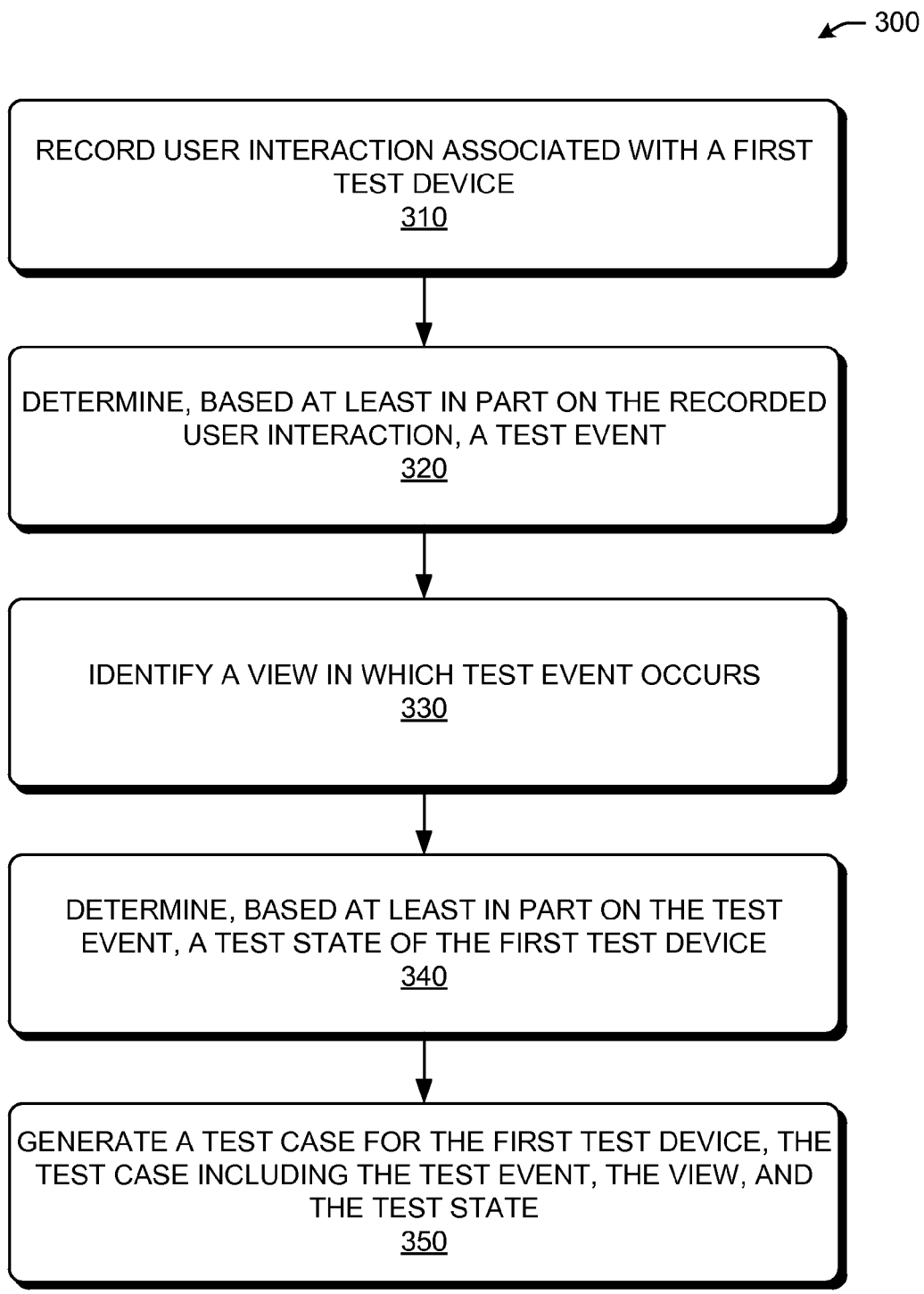
FIG. 3 illustrates a flow diagram for generating test cases in accordance with one or more embodiments of the disclosure.

Turning now to FIG. 3, a flow diagram for a method 300 is provided in accordance with one or more example embodiments. In block 310, the recording module 126 of the testing computer(s) 118 may record one or more user interactions associated with a first test device 102. In some implementations, the recording may be performed in response to a user selection (e.g., via a user interface provided by the testing computer(s) 118) to record user interactions. In block 320, the testing computer(s) 118 and/or the test case generation module 128 may determine a test event, based, at least in part, on the recorded user interaction. As previously mentioned, a test event may include various types of user inputs.

In block 330, the test case generation module 128 may identify a view in which the test event occurs. For example, if a test event includes selection of a button displayed by the user interface of the first test device 102, the test case generation module 128 may identify the particular view that represents the selected button. The functionality of block 330 is described in more detail with reference to FIG. 4. In block 340, the test case generation module 128 may be configured to determine, based at least in part on the test event, a test state of the first test device 102. As previously discussed, the test state may include any data in memory 106. In some embodiments, the test state may include state information regarding what is displayed by the display 114 of the first test device 102 after occurrence of the test event.

In block 350, the test case generation module 128 may generate a test case for the first test device 102. As such, the test case may include information associated with the test event, the view in which the test event occurred, and the test state. Furthermore, the test case generation module 128 may be configured to store the test case, such as in the storage 138 of the testing computer(s) 118 and/or any other storage device or storage location. In some embodiments, the testing computer(s) 118 may be configured to execute the test case on a second test device 140. Thus, the testing module 130 may retrieve the test case from the storage 138 and cause the second test device 140 to execute the test case. More particularly, the testing module 130 may access the test event and the view from the test case. The testing module 130 may then cause the second test device 140 to execute the test event with respect to the view included in the test case.

Figure 4:
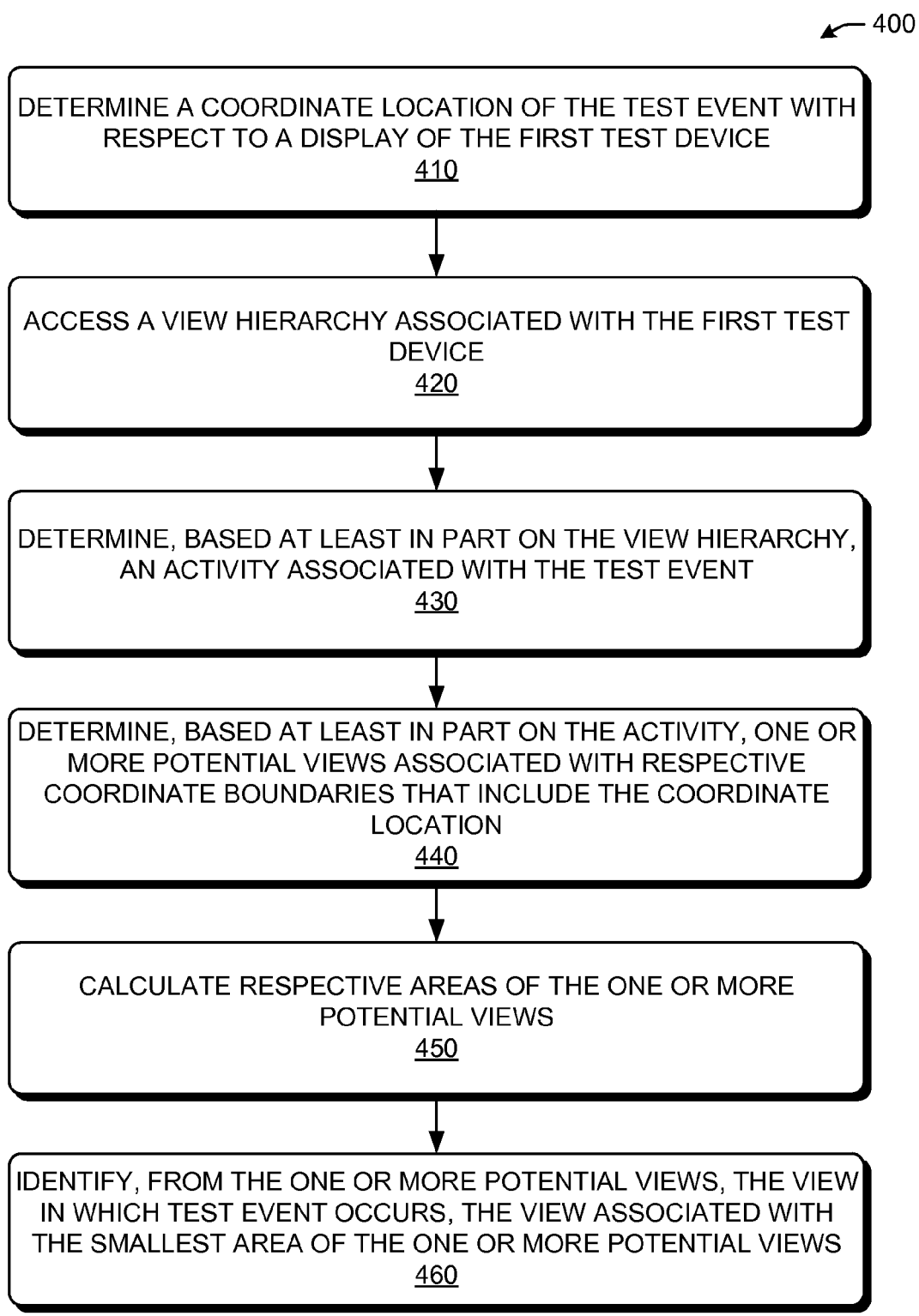
FIG. 4 illustrates another flow diagram for generating test cases in accordance with one or more embodiments of the disclosure.

FIG. 4 illustrates a flow diagram of a method 400 for determining views associated with test events, in accordance with one or more example embodiments. In some embodiments, the method 400 may describe the functionality corresponding to block 330 of FIG. 3. Thus, the method 400 may include block 410, in which the testing computer(s) 118 and/or the test case generation module 128 may determine a coordinate location of the test event with respect to a display 114 of the first test device 102. For example, the test case generation module 118 may be configured to logically divide the display 114 into multiple coordinates. As such, the test case generation module 128 may determine, from the multiple coordinates, a coordinate location in which the test event occurred or was performed. For instance, consider a scenario in which the test event may include touching check box 212A of the user interface 200A. To this end, the test case generation module 128 may determine a coordinate location of the touch.

In block 420, the test case generation module 128 may access a view hierarchy 200B associated with the first test device 102. In block 430, the test case generation module 128 may determine, based at least in part on the view hierarchy 200B, an activity associated with the test event. In block 440, the test case generation module 128 may determine, based at least in part on the activity, one or more potential views associated with respective coordinate boundaries that include the coordinate location associated with the test event.

Thus, referring back to the above example, the test case generation module 128 may access the view hierarchy 200B and determine that the test event includes the activity of touching a check box. In order to determine which check box has been touched (e.g., check box 212A), the test case generation module 128 may perform a search on the view hierarchy 200B to determine the potential views with coordinate boundaries that include the determined coordinate location of the test event (e.g., the touch event). Thus, the test case generation module 128 may determine that the potential views include the user interface view 202, the table view 208, the table row 210A, and the check box 212A. In other words, the test case generation module 128 may determine that the respective coordinate boundaries of the user interface view 202, the table view 208, the table row 210A, and the check box 212A all include the coordinate location associated with the touch event.

In block 450, the test case generation module 128 may be configured to calculate or otherwise determine (e.g., determine from a look-up table or other data stored in the nodes of the view hierarchy 200B) respective areas of the one or more potential views, and in block 460, the test case generation module 128 may identify, from the potential views, the view associated with the smallest area. Furthermore, the test case generation module 128 may determine that the view associated with the smallest area is in fact the view in which the test event occurred. Referring back to the above example, the test case generation module 128 may calculate the areas of the user interface view 202, the table view 208, the table row 210A, and the check box 212A. From these views, the test case generation module 128 may determine that the check box 212A has the smallest area, and that therefore, the touch event occurred with respect to the check box 212A.

Continuing with the above example, in certain implementations, the testing computer(s) 118 and/or the testing module 130 may be configured to execute the test event on a second test device 140. Since the test event may be associated with the view of check box 212A, the testing module 130 may be configured to cause the second test device 140 to display check box 212A. As such, the testing module 130 may then cause the second test device 140 to execute the test event (e.g., the touch) on the check box 212A, regardless of where the check box may be displayed on the second test device 140. Thus, execution of the test event may be free from dependence on particular coordinate locations, and may be performed on various devices having different form factors and display resolutions.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computerized method, comprising:
identifying, by a computer comprising one or more processors, a first test event associated with a first user interaction with a first test device, the first user interaction comprising interaction with a first display displaying a plurality of applications on the first test device;
determining, by the computer, at least one first view in which the first test event occurs;
determining, based at least in part on the first test event, a first state of the first test device;
storing information about the first test event, the at least one first view, and the first state of the first test device in a first test case;
identifying a second test event associated with a second user interaction with the first display on the first test device;
determining at least one second view in which the second test event occurs;
determining, based at least in part on the second test event, a second state of the first test device;

storing information about the second test event, the at least one second view, and the second state of the first test device in a second test case;

executing the first test case with respect to a second test device;

determining a third state of the second test device in response to the execution of the first test case on the second test device;

comparing, by the computer, the first state of the first test device with the third state of the second test device;

executing the second test case with respect to the second test device;

determining a fourth state of the second test device in response to the execution of the second test case on the second test device; and comparing, by the computer, the second state of the first test device with the fourth state of the second test device.

2. The method of claim 1, wherein the first display is configured to display a first display resolution and the second test device comprises a second display configured to display a second display resolution and wherein the first display resolution and the second display resolution are different.

3. The method of claim 1, further comprising:
receiving a command to record user interaction with the first test device.

4. The method of claim 1, further comprising:
accessing a view hierarchy associated with the first test device.

5. The method of claim 4, wherein determining the first view comprises:
determining one or more coordinates associated with the first test event; and
determining, based at least in part on the view hierarchy, one or more potential views within which the one or more coordinates lie.

6. The method of claim 5, wherein determining the first view further comprises:
determining, for the first test event, a respective view, of the one or more potential views, having the smallest area.

7. A testing system, comprising:
at least one processor;
at least one memory storing computer-executable instructions, that when executed by the at least one processor, cause the at least one processor to:
identify an event associated with user interaction with a first display of a first device;
identify a view in which the event occurs;
capture, after occurrence of the event, a state of the first device;
generate a test case for the first device, the test case comprising information about the event, the view, and the state;
send the test case to a second device; and
send, to the second device, further instructions to execute the event on the second device.

8. The testing system of claim 7, wherein the event is associated with user interaction with respect to a plurality of applications on the device.

9. The testing system of claim 7, wherein the view comprises one or more user interface components associated with an operating system of the first device.

10. The testing system of claim 7, wherein the event comprises at least one of a selection, a key press, a swipe gesture, a multi-touch gesture, input from an external device, or a user input.

11. The testing system of claim 7, wherein the instructions to identify the view comprise further instructions to:
determine a coordinate location of the event with respect to the first display of the first device;
access a view hierarchy associated with the first device;
determine, based at least in part on the view hierarchy, an activity associated with the event; and
determine, based at least in part on the coordinate location and the activity, the view in which the event occurs.

12. The testing system of claim 11, wherein the instructions to identify the view comprise further instructions to:
determine, based at least in part on the activity, one or more potential views associated with respective coordinate boundaries that include the coordinate location;
calculate respective areas of the one or more potential views; and
identify, from the one or more potential views, the view in which the event occurs, the view associated with the smallest area of the one or more potential views.

13. The testing system of claim 7, wherein the instructions further cause the at least one processor to:
determine a second state of the second device and a second view displayed by the second device in response to execution of the event; and
compare the second state of the second device with the state of the first device.

14. The testing system of claim 13, wherein the instructions further cause the at least one processor to:
determine, based at least in part on the comparison, a success or failure of the test case with respect to the second device.

15. A non-transitory computer readable medium comprising instructions that when executed by at least one processor, cause the at least one processor to:
determine a test event associated with user interaction with a first test device, the user interaction comprising interaction with a first display displaying a plurality of applications on the first test device;
identify a view in which the test event occurs;
determine a test state of the first test device in response to execution of the test event on the first test device;
generate a test case for the first test device, the test case comprising information about the event, the view, and the test state;
send the test case to a second test device; and
send, to the second test device, further instructions to execute the test event with respect to the view.

16. The computer readable medium of claim 15, wherein the instructions to identify the view comprise further instructions to:
determine a coordinate location of the test event on the first display of the first test device;
access a view hierarchy associated with the first test device;
determine, based at least in part on the view hierarchy, an activity associated with the test event;
determine, based at least in part on the coordinate location and the activity, the view in which the test event occurs.

17. The computer readable medium of claim 16, wherein the instructions to identify the view comprise further instructions to:
determine, based at least in part on the activity, one or more potential views associated with respective coordinate boundaries that include the coordinate location;
calculate respective areas of the one or more potential views; and
identify, from the one or more potential views, the view in which the test event occurs, the view having the smallest area of the one or more potential views.

18. The computer readable medium of claim 16, wherein the instructions further cause the at least one processor to: determine a second state of the second test device based on the execution of the test event; and compare the second state of the second test device with the test state of the first test device.

19. The computer readable medium of claim 18, wherein the instructions further cause the at least one processor to:
determine, based at least in part on the comparison, a success or failure of the test case with respect to the second test device.

\* \* \* \* \*